METHOD AND APPARATUS FOR PACKAGING PRODUCTS

Original Filed April 10, 1968 2 Sheets-Sheet 1

METHOD AND APPARATUS FOR PACKAGING PRODUCTS

Original Filed April 10, 1968 2 Sheets-Sheet 2

United States Patent Office

Re. 27,977
Reissued Apr. 23, 1974

27,977

METHOD AND APPARATUS FOR PACKAGING PRODUCTS

Alfred C. Monaghan, Warren, N.J., assignor to Weldotron Corporation, Newark, N.J.

Original No. 3,540,187, dated Nov. 17, 1970, Ser. No. 720,233, Apr. 10, 1968. Application for reissue Nov. 15, 1972, Ser. No. 306,564
Int. Cl. B65b *11/12, 41/02, 57/12*
U.S. Cl. 53—30 28 Claims

Matter enclosed in heavy brackets [ ] appears in the original patent but forms no part of this reissue specification; matter printed in italics indicates the additions made by reissue.

ABSTRACT OF THE DISCLOSURE

A product wrapping system includes means for detecting the length of the product, for providing a sheet of film of appropriate length and for feeding the sheet so that the leading end portion of the sheet underlies the trailing end of the product, for wrapping the trailing end of the sheet over, around and under the leading end of the product so that the trailing end of the sheet underlies the leading end of the product and the leading end of the sheet, to provide a sleeve wrap around the product. The system also includes means for folding down the open ends of the sleeve and for laying these folded down ends under the product in overlapped relationship, to provide a product which is overwrapped on all four sides.

BACKGROUND OF THE INVENTION

Field of the invention

This invention relates to the packaging of articles in a web of sheet material.

Description of the prior art

Many types of products are wrapped in transparent thermoplastic films. It is frequently required that the two pairs of mating edges of the film be overlapped and sealed in the process of forming the wrap. The overlap type of closure or seal is utilized to provide a high level of protection against the seepage of fluid matter out of or into the package. Frequently the articles may vary in dimension, e.g. length. A typical product employing such a packaging technique is the tray filled with fresh meat commonly solid in supermarkets. The width of the tray is generally standard, the length of the tray varies depending on the cut of meat packed. The butcher may prepare one cut for a short time, then subsequently prepare a different cut requiring a different package size. Presently, depending on the wrapping rate required, such wrapping is performed manually, semimanually, or on rather complex automatic equipment.

SUMMARY OF THE INVENTION

It is an object of this invention to provide a relatively simple system for automatically providing the desired lap type overwrap. Another object is to provide such a system which will accommodate a varying range of package sizes.

A feature of this invention is a system which automatically detects the length of the product to be wrapped; automatically provides a web of sheet material of an appropriate length; automatically wraps the web around the product to form a sleeve with lateral openings and a transverse overlap seal. An additional feature of this invention is a system which automatically receives the sleeve wrapped product, and automatically folds over the ends of the sleeve to form a longitudinal overlap seal.

BRIEF DESCRIPTION OF THE DRAWING

These and other objects, features and advantages of the invention will be apparent from the following specification thereof, taken in conjunction with the accompanying drawing in which.

DESCRIPTION OF THE FIRST EMBODIMENT

Figure 1:
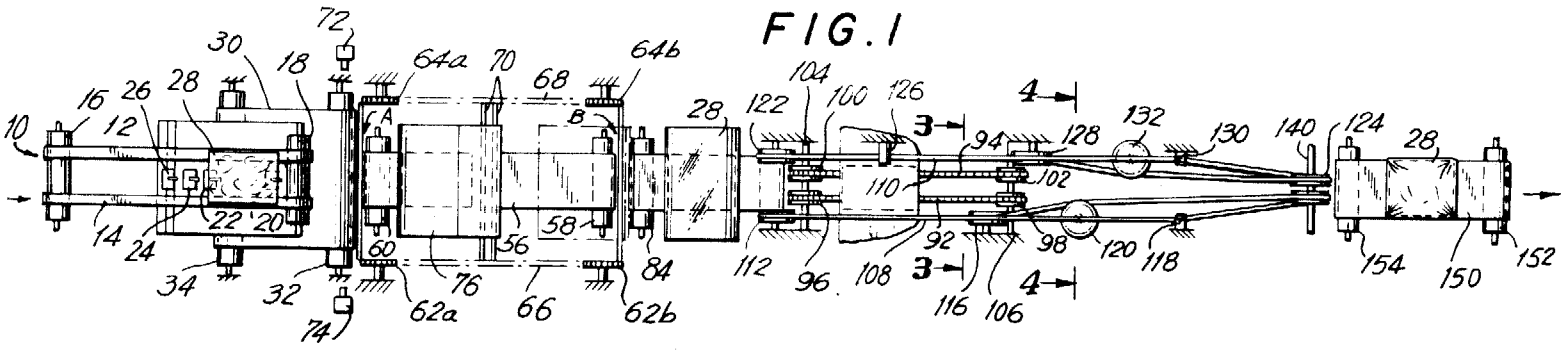
FIG. 1 is a top plan view of an apparatus embodying this invention.

The products to be wrapped are sequentially disposed on an infeed conveyor 10. This conveyor includes two parallel spaced apart belts 12 and 14 passing around two rollers 16 and 18. The "machine direction" is defined as the direction of movement of each product as it is wrapped. A plurality of sensing switches are suitably mounted with their actuators extending up between the upper runs of the belts 12 and 14. The actuator of the switch 20 is adjacent the downstream end of the conveyor, the actuators of the switches 22, 24 and 26 are further upstream. When the leading (downstream) edge of the product 28 operates the actuator of the switch 20, the remainder of the product will overlap and actuate either the switch 22; or the switches 22 and 24; or the switches 22, 24 and 26, depending on the length of the product.

A porous belt 30 passes around two rollers 32 and 34, at an angle to and beneath the belts 12 and 14. A plurality of hoppers or trays 36, 38 and 40 are disposed adjacent to and above the upper run of the belt 30. A like plurality of vacuum chambers 42, 44 and 46 are disposed immediately beneath the upper run of the belt 30, respectively adjacent the hoppers 36, 38, 40.

The vacuum chambers 42, 44 and 46 are open topped and are each coupled to a vacuum source 48 by a respective one of a plurality of solenoid operated valves 50, 52, 54. The solenoids are coupled to an electrical power source, not shown, by a switching matrix, not shown, which includes the switches 20, 22, 24, 26 and suitable AND and OR gates. When the product actuates the switches 20 and 22, the solenoid 54 is energized, to effect the evacuation of the vacuum chamber 46. When the product actuates the switches 20, 22 and 24, the solenoid 52 is energized, to effect the evacuation of the vacuum chamber 44. When the product is long and concurrently actuates the switches 20, 22, 24 and 26, the solenoid 50 is energized, to effect the evacuation of the vacuum chamber 42. A stack of long sheets of thermoplastic material is disposed in the hopper 36 with the leading lower edge portion of the stack bent up, and overlying a portion of the belt 30 and the vacuum chamber 42. A stack of medium length sheets is disposed in the hopper 38 with the leading lower edge portion bent up and overlying a portion of the belt 30 and the vacuum chamber 44. A stack of short sheets is disposed in the hopper 40 with the leading lower edge portion bent up and overlying a portion of the belt 30 and the vacuum chamber 46.

When a product on the belts 12 and 14 causes the evacuation of one of the open topped vacuum chambers, the vacuum is effective to cause the lowermost sheet in the respective stack to adhere to the porous belt 30 and to be drawn from the stack. The leading edge of the product and the leading edge of this sheet, which sheet is to serve as a wrapper for the product, are then fed to the next adjacent conveyor belt 56. The phasing of this feed is not critical and is advantageously set so that the leading edge of the product leads the leading edge of the sheet downstream in the machine direction by a distance slightly less than one half of the length of the product. Thus, as the product rides onto the conveyor 56, the trailing portion of the underside of the product will rest on the leading portion of the sheet 76.

Figure 2:
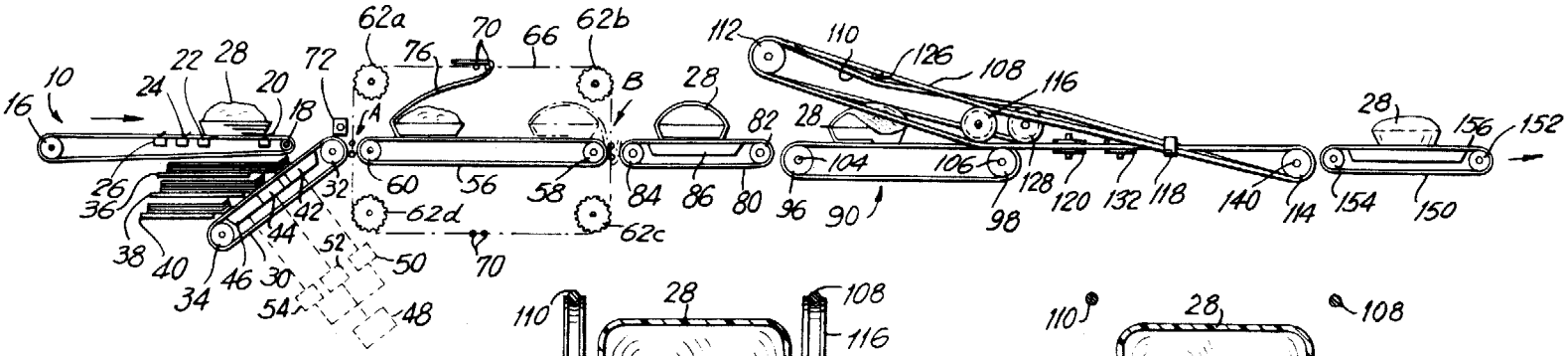
FIG. 2 is a side elevation view of the apparatus of FIG. 1.

The belt 56 passes around two rollers 58 and 60. Two sets of four sprocket wheels each 62A, 62B, 62C, 62D and 64A, 64B, 64C and 64D are journaled on suitable stub shafts on each side of the belt 56. An endless chain 66 passes around the sprocket wheels 62A . . . D, and an endless chain 68 passes around the sprocket wheels 64A . . . D [. Two] *to form a conveyor track for two pairs of flights or rods 70*. The two pairs of flights or rods 70 are supported by and between the endless chains 66 and 68. A photocell 72 and a photodetector 74 are disposed on a line between the conveyors 12/14 and 56. When the product 28 moves from the conveyor 12/14 onto conveyor 56 its trailing edge unblocks the light beam between the photocell and the detector which operate a relay circuit and drive, not shown, coupled to the sprocket wheels 62A and 64A, to cause the chains 66 and 68 to move in the clockwise direction as shown in FIG. 2 a distance equal to one-half their periphery. In so doing the flights 70 which are initially disposed at a station A at the upstream end of the conveyor 56 swing up, around and down to a station B at the downstream end of the conveyor 56, engaging the sheet of film 76 which has been advanced by the conveyor belt 30, and wrapping the trailing end of the sheet 76 about the product, leaving the trailing end dangling down in the gap between the conveyor 56 and the next conveyor 80.

The conveyor belt 80 passes around two rollers 82 and 84. A hot plate 86, which may be electrically powered, is disposed under the upper run of the belt 80. The belt 80 may be made of a suitable heat transmitting yet heat resistant material, such as silicone rubber. As the product advances from the conveyor 56 to the conveyor 80, the trailing portion of the sheet of film laps around and under the leading edge of the product, overlapping the leading portion of the sheet of film which is already on the underside of the product. As the package then passes over the hot plate 86, the overlapped leading and trailing portions of the sheet of film on the underside of the product are sealed together. At this stage of its travel the product now has a sleeve or cylindrical section of film formed thereabout which extends beyond the product on both sides. If merely a sleeve wrap is desired the conveyor [86] *80* may discharge the sleeve wrapped product from the system. If a shrunk sleeve is desired, the conveyor *80* may discharge the sleeve wrapped product to a heat shrink tunnel, such as shown in U.S. Pat. No. 3,222,800, issued to M. Siegel et al., on Dec. 14, 1965, *and such as is shown schematically in FIGS. 5 and 6*. If a four sided overlap is desired, the conveyor 80 may discharge the product to a side wrapping system such as 90.

Figure 4:
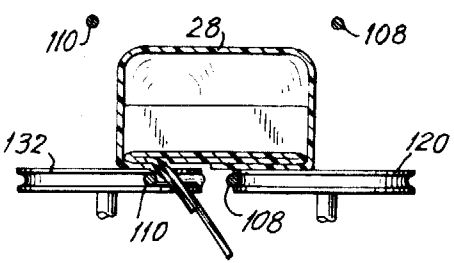
FIG. 4 is an end cross-sectional view taken along the plane 4—4 of FIG. 1.
Figure 3:
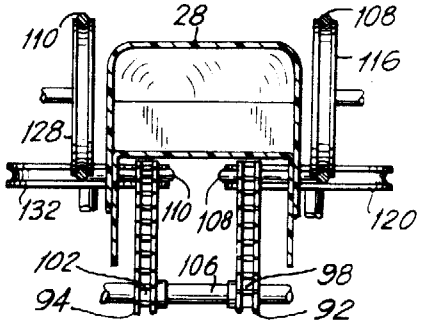
FIG. 3 is an end cross-sectional view taken along the plane 3—3 of FIG. 1.

The side wrapping system 90 comprises two spaced apart infeed conveyor belts or chains 92 and 94 which are respectively passed around sheaves or sprocket wheels 96, 98, 100 and 102. The wheels 96 and 100 may be fixed to the common shaft 104 which is suitably journaled, and the wheels 98 and 102 may be fixed to a common shaft 106 which is suitably journaled. A pair of spaced apart belts 108 and 110 straddle the infeed conveyor belts, and provide a sleeve folding function. The folding belt 108, which is endless, preferably is of circular cross-section, and passes around a horizontally journaled sheave 112 at its upstream end and around a horizontally journaled sheave 114 at its downstream end. The upper run of the belt 108 comes off the top of the sheave 112, passes over a horizontally journaled sheave 116, under a horizontally journaled roller 118, under, around and back over the sheave 114, and against a vertically journaled sheave 120, and under and around the roller 112. The folding belt 110, which is endless, preferably is of circular cross-section, and passes around a horizontally journaled sheave 122 at its upstream end and around a horizontally journaled sheave 124 at its downstream end. The upper run of the belt comes off the top of the sheave 122, passes under a horizontally journaled roller 126, over a horizontally journaled sheave 128, under a horizontally journaled roller 130, under, around and back over the sheave 124, against a vertically journaled sheave 132, and then under and around the sheave 122. As will be seen in FIG. 2, the sheaves 116 and 128 are disposed above the base level of the product. The sheaves 120 and 132 are disposed at the base level of the product, the rollers 118 and 130 are disposed at the base level of the product. The sheaves 114 and 124 are disposed just below the base level of the product. The sheave 116 is disposed upstream in the machine direction of the sheaves 98 and 102, while the corresponding sheave 128 is disposed downstream of the sheaves 98 and 102. The sheave 120 is disposed upstream of the corresponding sheave 132. The rollers 118 and 130 are substantially in line. The sheaves 114 and 124 may be fixed to a common shaft 140 and are relatively closely spaced to converge the belts 108 and 110 at the downstream end of the system 90. As the packages proceed under the two round folding belts, the belts fold the upper layer of the film down. At this stage, the product is supported on the upper runs of the two support chains 92 and 94. When the folding belts are flush with the base of the product, the film has been folded down to 90°, as shown in FIG. 3. The lower layer of film is now pushed down by the upper layer of film and the folding belts continue to descend as they travel downstream in the machine direction until the upper surface of the folding belts are level with the base of the product. At this stage, the folding belts begin to converge, and the support chains end. The product transfers onto the folding belts and as these belts continue to converge, the film, which has already been folded down, is now folded under the product, as shown in FIG. 4. The belts are staggered in their convergence so that the folding belt 108 folds its side down and under first and the belt 110 folds its side down and under subsequently, so that the two sides will overlap without interference. The system 90 then discharges the product to the next conveyor belt 150. The conveyor belt 150 passes around two rollers 152 and 154. A heating plate 156, which may be electrically powered, is disposed under the upper run of the belt 150. The belt 150 may be made of suitable heat transmitting, yet heat resistant, material. As the product passes over the heated belt 150 the heat seals all of the underwrapped layers together to provide a fully sealed package. If a heat shrink package is desired the system may discharge the wrapped product to a heat shrink tunnel as previously described.

DESCRIPTION OF THE SECOND EMBODIMENT

Figure 5:
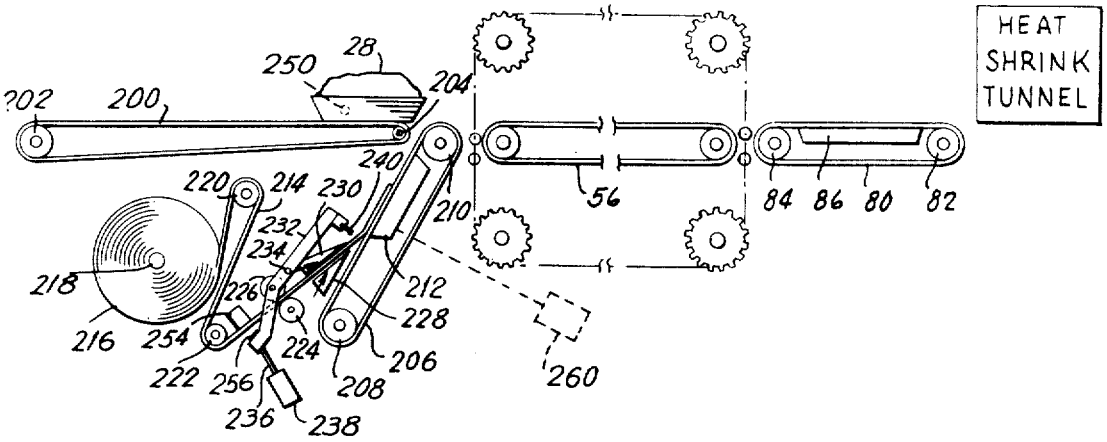
FIGS. 5 and 6 are side elevation views of a modification of the sleeve wrap apparatus of FIG. 1.
Figure 6:
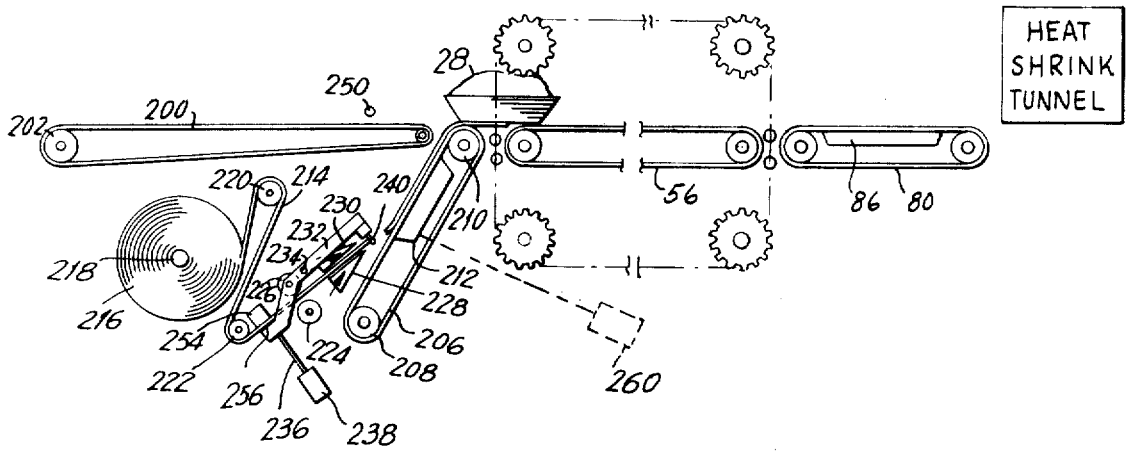

An alternative system for providing sheet film for wrapping from a continuous film supply roll rather than from a stack of pre-cut sheets is shown in FIGS. 5 and 6. An input conveyor belt 200 passes around two rollers 202 and 204. A porous belt 206 passes around two rollers 208 and 210. A vacuum chamber 212 is disposed beneath the upper run of the conveyor belt 206. A continuous web of sheet material 214 unwinds from a supply roll 216 which is disposed on a shaft 218, passes around a guide roller 220, around a guide roller 222, between two pinch rollers 224 and 226, between two wedge shaped air ducts 228 and 230, onto the upper run of the conveyor belt 206. The upper pinch roller is supported between a pair of arms 232 which are pivoted on a shaft 234 for rocking motion. The lower ends of the arms 232 are coupled to the piston 236 of a solenoid valve operated air cylinder 238. The upper ends of the arms 232 support a radiant heat cut-off element 240, such as electrically powered resistance wire, such as is shown in U.S. Pat. 3,135,077, issued to M.

Siegel et al., on June 2, 1964. The pinch roller 224 is driven by a suitable drive, not shown. A photocell and a photodetector 250 provide a light beam across the upper run of conveyor belt 200 slightly upstream of its downstream end. A clamping pad 254 may be disposed above the web of sheet material 214 and the lower end of the arms 232 may also support a pressure pad 256 below the web in line with the pad 254.

When a product interrupts the light beam, the photodetector operates a suitable relay, not shown, which actuates the solenoid valve of the cylinder 238 to cause the cylinder to release the pressure pad 256 from the web and the clamping pad 254, while concurrently pinching the web between the pinch rollers 226 and 224. The pinch rollers advance the web between the wedge shaped pressurized ducts 228 and 230, which ducts are coupled to a source of positive air pressure, not shown. The air flow supplied by the ducts floats and guides the web between the ducts and onto the upper run of the conveyor belt 206. The relay also operates a solenoid operated valve 260 which couples the vacuum chamber 212 to a suitable source of pressure, not shown. After the predetermined length of film has been fed out, which may be controlled by a series of switches in a switch matrix such as was described with respect to FIG. 1, the solenoid operated valve now causes the piston 236 to extend, clamping the film between the pads 254 and 256, releasing the pinch rollers 226 and 224 and bringing hot wire 240 down onto the film which is tensioned between the pads 254/256 and the moving belt 206, thereby cutting the web which continues to be fed by the belt 206 for wrapping around the product as described with respect to FIG. 1.

While there have been shown and described preferred embodiments of the invention, it will be understood that the invention may be embodied otherwise than as herein specifically illustrated or described, and that in the illustrated embodiments certain changes in the details of construction and in the form and arrangement of the parts may be made without departing from the underlying ideal and principles of this invention within the scope of the appended claims:

What is claimed is:

1. Apparatus for wrapping a product in a sheet of material comprising; means for conveying the product along a path in the machine direction; a first station on said path, and a second station on said path downstream of said first station; means for providing a sheet of material having a length adequate to form a sleeve around the product, and for conveying the leading end of the sheet from below said path into said first station to the underside of the product while the product is passing through said first station, whereby the leading end of the sheet underlies the trailing end of the product; *conveying* means independent of said product conveying means disposed between said first and second stations, movable [in] *along a track following* an endless path separate from the path of movement of said *product* conveying means for engaging the trailing end of the sheet at said first station, after the product has passed through first station, and before the product has reached said second station, and for conveying the trailing end of the sheet up behind, over the top, and down in front of the product, through said second station and transversely of and beneath said *product path*, so that, subsequently, as the product passes through said second station, the trailing end of the sheet is pulled under the leading end of the product by the operation of the conveying means at said second station, forming a sleeve about the product.

2. Apparatus for wrapping a product in a sheet of material comprising; means for conveying the product along a path in the machine direction; a first station on said path, and a second station on said path downstream of said first station; means for providing a sheet of material having a length adequate to form a sleeve around the product, and for conveying the leading end of the sheet from below said path into said first station to the underside of the product while the product is passing through said first station, whereby the leading end of the sheet underlies the trailing end of the product; means disposed between said first and second stations for engaging the trailing end of the sheet at said first station, after the product has passed through first station, and before the product has reached said second station, and for conveying the trailing end of the sheet up behind, over the top, and down in front of the product, through said second station and transversely of and beneath said path, so that, subsequently, as the product passes through said second station, the trailing end of the sheet is pulled under the leading end of the product by the operation of the conveying means at said second station, forming a sleeve about the product, said *product* conveying means comprising first, second and third conveyor systems disposed in line; said first station being disposed between said first and second conveyor systems; said second station being disposed between said second and third conveyor systems; and said means for engaging the trailing end of the sheet comprising a fourth conveyor system operative up through said first station, over said second conveyor system, and down through said second station.

3. Apparatus according to claim 2 wherein said path is horizontal; and said fourth conveyor system includes *support means and* an elongated member horizontally supported for movement by *said* support means up between said first and second conveyor systems, over said second conveyor system, and down between said second and third conveyor systems.

4. Apparatus according to claim 3 wherein:

said fourth conveyor system support means comprises a pair of spaced apart, parallel, congruent, endless chains, straddling said second conveyor system; and said elongated member comprises a rod coupled to and between said pair of chains.

5. Apparatus according to claim 1 wherein said sheet providing means comprises:

a porous conveyor belt disposed below said path, having one end thereof extending up into said first station;

a vacuum chamber disposed beneath the upper run of the conveyor belt, coupled to means for effecting the evacuation of said chamber and thereby providing suction through the adjacent portion of said conveyor belt; and means for supporting a sheet adjacent said portion of said upper run of said belt, whereby when said chamber is evacuated, the suction through said portion is effective to adhere at least a portion of the sheet to said belt, so that said belt conveys the leading end of the sheet up into said first station and said path.

6. Apparatus for wrapping a product in a sheet of material comprising: means for conveying the product along a path in the machine direction; a first station on said path, and a second station on said path downstream of said first station; means for providing a sheet of material having a length adequate to form a sleeve around the product, and for conveying the leading end of the sheet from below said path into said first station to the underside of the product while the product is passing through said first station, whereby the leading end of the sheet underlies the trailing end of the product; means disposed between said first and second stations, movable for engaging the trailing end of the sheet of said first station, after the product has passed through first station, and before the product has reached said second station, and for conveying the trailing end of the sheet up behind, over the top, and down in front of the product, through said second station and transversely of and beneath said path, so that, subsequently, as the product passes through said second station, the trailing end of the sheet is pulled under the leading end of the product by the operation of the conveying means at said second station, forming a sleeve about the product, said *product* conveying means comprising first, second and third conveyor systems disposed in line; said first station being disposed between said first and second conveyor systems; said second station being disposed between said second and third conveyor systems; and said means for engaging the trailing end of the sheet comprising a fourth conveyor system operative up through said first station, over said second conveyor system, and down through said second station; said sheet providing means comprising a porous conveyor belt disposed below said path having one end thereof extending up into said first station, a plurality of vacuum chambers, each disposed beneath said upper run of said porous conveyor belt; a like plurality of means for supporting a respective like plurality of sheets, each sheet being of a different length; and means for detecting the length of the product and in response thereto for selectively causing one of the vacuum chambers to be evacuated, so that a sheet of appropriate length is adhered to the porous belt.

7. Apparatus for wrapping a product in a sheet of material comprising: means for conveying the product along a path in the machine direction; a first station on said path, and a second station on said path downstream of said first station; means for providing a sheet of material having a length adequate to form a sleeve around the product, and for conveying the leading end of the sheet from below said path into said first station to the underside of the product while the product is passing through said first station, whereby the leading end of the sheet underlies the trailing end of the product; means disposed between said first and second stations for engaging the trailing end of the sheet at said first station, after the product has passed through first station, and before the product has reached said second station, and for conveying the trailing end of the sheet up behind, over the top, and down in front of the product, through said second station and transversely of and beneath said path, so that subsequently, as the product passes through said second station, the trailing end of the sheet is pulled under the leading end of the product forming a sleeve about the product, said sheet providing means comprising a porous conveyor belt disposed below said path and extending up into said first station, a vacuum chamber disposed beneath the upper run of the conveyor belt, coupled to means for effecting the evacuation of said chamber and thereby providing suction through the adjacent portion of the conveyor belt; means for supplying a continuous web of sheet material; first means for conveying the leading end of the web to said portion of said belt adjacent said vacuum chamber; second means for clamping a mediate portion of the web; said first and second means being alternatively operable; and third means for severing the leading end portion of the web from the mediate portion of the web, operative concurrently with said second means.

8. Apparatus according to claim 7 wherein:

said supply means includes a roll of said sheet material;

said first means includes a pair of driven pinch rollers, and a pair of spaced apart air ducts coupled to a source of positive air pressure;

said second means includes a pair of clamping members; and said third means includes an elongated, radiant heat source.

9. Apparatus according to claim 2 wherein said third conveyor system includes a heat source for sealing the ends of the sheet beneath the product.

10. Apparatus according to claim 2 wherein the sleeve has open ends extending beyond the product, and further including:

a [fourth] *fifth* conveyor system disposed in line with said third conveyor system;

said [fourth] *fifth* conveyor system including:

first folding means for initially folding down and under the product one of the overextending ends of the sleeve, and second folding means for subsequently folding down and under the product the other of the overextending ends of the sleeve.

11. Apparatus according to claim 10 wherein said [fourth conveyor means] *fifth conveyor system* further includes:

a first pair of spaced apart conveyor chains extending in the machine direction from the downstream end of said third conveyor system to an intermediate stage in the length of said [fourth conveyor means] *fifth conveyor system* in the machine direction;

said first and second *folding* means comprises a second pair of spaced apart endless belts, each having a first portion straddling said first pair of chains and a second portion extending and converging downstream in the machine direction beyond said first pair of chains;

said first portion of each belt having a lower run descending towards the upper runs of said first pair of chains;

said second portion of each belt having an extension of said lower run of said first portion which is coplanar with the upper runs of said first pair of chains, and having an extension of said upper run of said first portion which passes through and below the plane of said upper runs of said first pair of chains;

whereby said first pair of chains support and convey said sleeve wrapped product along said path in said machine direction while said lower runs of said first portion of said belts progressively ride down on and fold down the extending ends of the sleeve about said product, and said converging extension of said lower runs of said first portion in said second portion support and convey said product along said path in said machine direction while said extension of said upper runs of said first portion in said second portion fold the folded down ends of the sleeve under the product.

*12. Apparatus for wrapping a product in a sheet of material comprising*

*first, second and third conveyor means arranged sequentially for conveying the product along a predetermined path;*

*a first station on said path between said first and second conveyor means, and a second station on said path downstream of said first station and between said second and third conveyor means;*

*means for providing a sheet of material having a length adequate to form a sleeve around the product with some overlap, and for conveying the leading end of the sheet from below said path into said first station;*

*said first conveyor means conveying the product to said second conveyor means such that the trailing end of the product overlies the leading end of the sheet;*

*wrap means disposed between said first and second stations and movable in an endless path surrounding the second conveyor means for engaging the trailing end of the sheet at said first station, after the product has passed through first station, and before the product has reached said second station, and for conveying the trailing end of the sheet up behind, over the top, and down in front of the product, through said second station and transversely of and beneath said product path, so that, subsequently, as the product passes through said second station, the trailing end of the sheet is tucked under the product and under the leading end of the sheet by the operation of the second and third conveyor means at said second station, forming a sleeve about the product;*

*said wrap means completely encircling said second conveyor means along a path spaced from said second conveyor means along substantially its entire upper surface.*

*13. Automatic packaging apparatus comprising*

*a wrapping conveyor having an input end and an output end and an upper surface therebetween for conveying successive articles to be wrapped;*

*package receiving means adjacent the output end of said wrapping conveyor;*

*wrapper feeding means supplying sheets of wrapping material and feeding the leading end of each such sheet to a position adjacent the input end of said wrapping conveyor;*

*article feeding means for passing each article to be wrapped onto the input end of said wrapping conveyor and onto the leading end of a sheet of wrapping material;*

*said wrapping conveyor extending substantially the entire distance between said article feeding means and said package receiving means, but being spaced from both said means; and*

*carrier means extending along a closed path which encircles the wrapping conveyor and is spaced vertically from the upper surface thereof over substantially its entire length, said carrier means carrying at least one wrap bar along a path about said wrapping conveyor to wrap said sheet of wrapping material about an article on said conveyor, said wrap bar path completely encircling said wrapping conveyor in spaced relation thereto over substantially its entire upper surface and passing through the spaces between the wrapping conveyor and the article feeding and package receiving means;*

*said wrap bar contacting the free portion of said sheet of wrapping material while the leading end thereof remains restrained underneath said article, and after said article is completely on said wrapping conveyor, conveying the trailing end thereof up over the article and down in front of it, adjacent the output end of said wrapping conveyor; and*

*said wrapping conveyor advancing said article onto said package receiving means to cause the trailing end of said sheet of wrapping material to overlap the leading end thereof, underneath the article.*

*14. Apparatus as in claim 13 wherein the wrap bar follows a substantially rectangular path which completely encircles said wrapping conveyor, one side of said rectangle passing above the wrapping conveyor in spaced relation thereto.*

*15. Apparatus as in claim 13, wherein said carrier means is an endless conveyor, separate from the wrapping conveyor, which extends along said closed path and carries the wrap bar along substantially the same path.*

*16. Apparatus as in claim 13, wherein the wrap bar carries the trailing end of the sheet of wrapping material up over the article to be wrapped and down in front of the article to hang free and unconstrained adjacent the output end of said wrapping conveyor.*

*17. Apparatus as in claim 13, wherein the wrap bar carries the trailing end of the sheet of wrapping material up over the article to be wrapped, as the article is moving along the wrapping conveyor, and down in front of the article and beyond the output end of the wrapping conveyor to hang free and unconstrained into the space between the wrapping conveyor and the package receiving means.*

*18. Apparatus as in claim 13, further including means associated with the package receiving means for sealing the overlapped ends of said sheet of wrapping material, and a shrink tunnel disposed in cooperative relation to said package receiving means for shrinking the sheet of wrapping material about said article after the overlapped ends have been sealed.*

*19. Apparatus as in claim 13, wherein said package receiving means and said article feeding means are conveyor means in line with said wrapping conveyor, but spaced therefrom, and wherein the path of the wrap bar passes between the article feed conveyor means and the wrapping conveyor, then over the wrapping conveyor in spaced relation to substantially its entire upper surface, then between the package receiving conveyor means and the wrapping conveyor, and then under the wrapping conveyor in spaced relation thereto, to completely encircle the wrapping conveyor.*

*20. Automatic packaging apparatus comprising*

*a wrapping conveyor having an input end and an output end and an upper surface therebetween for converying successive articles to be wrapped in a forward direction between said input and output ends;*

*package receiving means adjacent the output end of said wrapping conveyor but spaced therefrom;*

*wrapper feeding means supplying sheets of wrapping material and feeding the leading end of each such sheet to a position above the upper surface of said wrapping conveyor adjacent its input end;*

*article feeding means for passing each article to be wrapped onto the input end of said wrapping conveyor and onto the leading end of a sheet of wrapping material; and*

*carrier means carrying at least one wrap bar along a path about said wrapping conveyor to wrap said sheet of wrapping material about an article on said conveyor, said wrap bar completely encircling said wrapping conveyor in spaced relation thereto, passing in spaced relation to and along substantially its entire upper surface in a forward direction at a height above that of the article to be wrapped, in spaced relation to and along its bottom surface in a rearward direction, and along its input and output ends in an upward and downward direction, respectively, in the spaces between the wrapping conveyor and the article feeding and package receiving means;*

*the advance of the wrap bar along said path conveying the trailing end of said wrapping material up over the article and down in front of it, adjacent the output end of said wrapping conveyor, after said article is completely on said wrapping conveyor, while the leading end of the wrapping material remains restrained underneath said article; and*

*said wrapping conveyor advancing said article onto said package receiving means to cause the trailing end of said wrapping material to overlap the leading end thereof, underneath the article, to form a sleeve wrap about the article.*

*21. Automatic packaging apparatus comprising*

*a wrapping conveyor having an input end and an output end and an upper surface therebetween for conveying successive articles to be wrapped;*

*package receiving conveyor means adjacent the output end of said wrapping conveyor but spaced therefrom;*

*wrapper feeding means supplying lengths of wrapping material and feeding the leading end of each such length to a position adjacent the input end of said wrapping conveyor;*

*article feeding means for passing each article to be wrapped onto the input end of said wrapping conveyor and onto the leading end of a length of the wrapping material;*

*carrier means extending along a closed path which encircles the wrapping conveyor and is spaced vertically from the upper surface thereof over substantially its entire length, said carrier means carrying at least one wrap bar along a path about said wrapping conveyor to wrap each length of said wrapping material about at least one article on said conveyor, said wrap bar path also completely encircling said wrapping conveyor;*

*said carrier means causing said wrap bar, after said article is completely on said wrapping conveyor, to lift the trailing end of said length of wrapping material up and over the article and down in front of it, adjacent the output end of said wrapping conveyor, to hang free and unconstrained adjacent said output end, while the leading end thereof remains restrained underneath said article;*

*said wrapping conveyor then advancing said article forwardly onto said package receiving conveyor means to cause the trailing end of said wrapping material to overlap the leading end thereof, underneath the article;*

*heater means associated with said package receiving conveyor means for sealing the overlapped ends underneath the article; and*

*a shrink tunnel associated with said package receiving conveyor means for shrinking the wrapping material about said article to form a tight sleeve wrap thereabout after the overlapped ends have been sealed.*

*22. Automatic packaging apparatus comprising*

*a wrapping conveyor having an input end and an output end and an upper surface therebetween for conveying successive articles to be wrapped;*

*package receiving means adjacent the output end of said wrapping conveyor but spaced therefrom;*

*wrapper feeding means supplying lengths of wrapping material and feeding the leading end of each such length to a position adjacent the input end of said wrapping conveyor;*

*article feeding means adjacent the input end of said wrapping conveyor for passing each article to be wrapped onto said input end and onto the leading end of a length of the wrapping material;*

*and endless conveyor driven independently of said wrapping conveyor and carrying at least one wrap bar along its path;*

*said endless conveyor passing along a closed path which surrounds said wrapping conveyor, said path extending above the upper surface of said wrapping conveyor, along substantially the entire length thereof, a distance at least equal to the height of the articles to be wrapped, so as to carry the wrap bar completely about the wrapping conveyor and the article located thereon;*

*said endless conveyor carrying the wrap bar into contact with the free portion of the length of wrapping material while the leading end thereof remains restrained underneath said article, to convey the trailing end of said length of wrapping material up over the article and down in front of it, after said article is completely on said wrapping conveyor;*

*said wrapping conveyor then advancing said article onto said package receiving means to cause the trail ing end of said length of wrapping material to overlap the leading end thereof, underneath the article.*

*23. Automatic packaging apparatus as in claim 22 wherein the endless conveyor comprises two endless chains which extend along closed paths parallel to one another, each such path surrounding the wrapping conveyor, and wherein the wrap bar is mounted at its opposite ends by said chains and extends between them.*

*24. Apparatus as in claim 22, wherein said endless conveyor carriers at least two wrap bars which are equally spaced about said closed path, and wherein the drive means for said endless conveyor operates in a start-stop fashion and is synchronized with the reception of the successive articles to be wrapped, so as to advance each of the wrap bars from its position to the position of the next-forward wrap bar along the closed path as each successive article to be wrapped is passed onto the wrapping conveyor by the article feeding means.*

*25. A method of forming a tight sleeve wrap of heat-shrinkable film about an article with a short overlap of the ends of the film underneath the article, comprising the steps of*

*feeding to the input end of a conveyor the leading end of a sheet of heat shrinkable film which is sufficient in length to extend completely around the article to be wrapped and form said overlap;*

*passing the article to be wrapped along a predetermined forward path by placing the article on the input end of the conveyor to rest on the leading end of said sheet and engage and hold said leading end while the remainder of the sheet extends off the input end of said conveyor;*

*the article having a length l in the direction of said predetermined path and the leading end of said sheet extending under the trailing portion of the article a distance d, where d is less than l;*

*conveying the trailing portion of said sheet, which is still uncovered by said article, up and over the top of said article and down over the output end of said conveyor, as the article is passing in said forward direction along the conveyor with the leading end of the wrapping sheet beneath it, to leave the trailing end of said sheet hanging free and unconstrained beyond the output end of the conveyor, extending in a downward direction beyond the upper surface of the conveyor a distance greater than l minus d by the length of said overlap;*

*tucking the freely hanging end of the sheet under the article and under the leading end of the sheet to form said overlap under the article by passing the article in said forward direction from the output end of the conveyor through the hanging end of said sheet and onto a receiving surface close to but spaced from the output end of the conveyor in said forward direction, while said article continues to maintain the leading end of the sheet engaged;*

*conveying the article along said receiving surface to pass over a heat source to heat said overlap region to form a seal between said overlapped ends; and*

*thereafter heat shrinking said sheet to form a tight sleeve wrap about said article.*

*26. The method of claim 25 wherein the step of conveying the free portion of the sheet over the article comprises passing a rod, which extends transverse to the forward direction of the article, upward adjacent the input end of the conveyor to pick up the free end of the sheet, then forwardly in the direction of movement of the article along the conveyor, over a path spaced from said conveyor along substantially its entire length, and at a speed faster than the speed of forward movement of the article, and then downwardly in front of the moving article and the output end of the conveyor, so as to encircle the entire conveyor with the rod as the successive articles to be wrapped pass along the moving conveyor.*

*27. The method of claim 25 wherein*

*the step of feeding the leading end of a sheet of heat shrinkable film to the input end of a conveyor involves feeding a sheet of such material which is substantially wider than the article to be wrapped;*

*the step of placing the article on the leading end of said sheet involves placing the article on the central area of the leading end so that substantial portions of said sheet extend laterally beyond both sides of the article;*

*wherein the step of tucking the freely hanging and unconstrained end of the sheet under the article and under the leading end of the sheet to form an overlap region involves tucking the free end under the leading end substantially the entire length of both the free end and the leading end, even including the portions of such ends which extend laterally beyond the sides of the article, to form an overlap over substantially said entire length;*

*wherein the step of sealing the overlapped ends involves sealing substantially said entire length, even beyond the sides of said article, to form a cylinder of film about said article which extends beyond the sides of the article on both sides; and*

*wherein the step of heat shrinking involves heat shrinking said film while it is in the form of a cylinder extending beyond the sides of the article, to form a tight retaining sleeve wrap about the article.*

*28. A method of shrink wrapping successive articles one after the other in a continuous operation comprising the steps of*

*feeding the leading ends of successive sheets of heat shrinkable film to the infeed end of a continuously moving conveyor, each such sheet having a length sufficient to extend completely around the article to be wrapped with some overlap;*

*placing the articles to be wrapped successively onto the input end of the conveyor to travel along the conveyor to its output end, each on the leading end of one of said sheets to engage and hold said leading end in place and to thereby convey the sheet with the article as it moves along the conveyor;*

*passing a rod upwardly against each successive sheet of film, adjacent the input end of the conveyor, to a height exceeding that of the article being wrapped, while the article and the sheet are passing along the conveyor, and then forwardly in the direction of the article travel along the conveyor to the output end thereof, without any contact between the rod and the conveyor, to convey the portion of each sheet uncovered by its associated article up and over said article and down over the output end of said conveyor to hang free and unconstrained,*

*thereafter advancing said conveyor to move said article onto an adjoining surface spaced from said conveyor, while said article continues to maintain the leading end of the sheet engaged, to thereby tuck the free end of the hanging sheet under the article and under the leading end of the sheet to form an overlap region;*

*sealing said free end and said leading end throughout said overlap region by a seal sufficiently strong to withstand the force of a controlled shrink of said sheet; and*

*heat shrinking said sheet said controlled amount to form a tight sleeve wrap about said article.*

References Cited

The following references, cited by the Examiner, are of record in the patented file of this patent or the original patent.

UNITED STATES PATENTS

| | | | |
|---|---|---|---|
| 3,276,184 | 10/1966 | Holt | 53—210 X |
| 3,348,356 | 10/1967 | Curtis | 53—30 |
| 3,353,333 | 11/1967 | Arvidson | 53—379 |
| 3,504,476 | 4/1970 | Ehrenfried | 53—210 X |
| 3,250,053 | 5/1966 | Hyer et al. | 53—66 |
| 3,287,876 | 11/1966 | Willbrandt | 53—33 |
| 3,355,166 | 11/1967 | Plumb | 53—389 X |

ROBERT L. SPRUILL, Primary Examiner

U.S. Cl. X.R.

53—33, 66, 74, 184, 209, 210, 389